United States Patent
Yoshida et al.

(10) Patent No.: US 10,133,657 B2
(45) Date of Patent: Nov. 20, 2018

(54) TEXTUAL SIMILARITY BASED SOFTWARE PROGRAM REPAIR

(71) Applicant: FUJITSU LIMITED, Kawasaki-shi, Kanagawa (JP)

(72) Inventors: Hiroaki Yoshida, Cupertino, CA (US); Ripon Kumar Saha, Austin, TX (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 15/051,503

(22) Filed: Feb. 23, 2016

(65) Prior Publication Data

US 2017/0242782 A1 Aug. 24, 2017

(51) Int. Cl.
*G06F 9/44* (2018.01)
*G06F 11/36* (2006.01)
*G06F 17/30* (2006.01)

(52) U.S. Cl.
CPC ...... *G06F 11/3688* (2013.01); *G06F 11/3692* (2013.01); *G06F 17/3053* (2013.01); *G06F 11/362* (2013.01); *G06F 11/3664* (2013.01); *G06F 2201/86* (2013.01); *G06F 2201/865* (2013.01); *G06F 2201/88* (2013.01)

(58) Field of Classification Search
CPC ............... G06F 11/362; G06F 11/3664; G06F 11/3688; G06F 11/3692
See application file for complete search history.

(56) References Cited

U.S. PATENT DOCUMENTS

| | | | | |
|---|---|---|---|---|
| 2009/0292941 A1* | 11/2009 | Ganai | ................ | G06F 11/3636 714/2 |
| 2012/0185731 A1* | 7/2012 | Barman | ............... | G06F 11/3604 714/38.1 |
| 2013/0339929 A1* | 12/2013 | Logozzo | ............. | G06F 9/44589 717/124 |
| 2014/0149435 A1* | 5/2014 | Sisman | ................ | G06F 11/362 707/751 |
| 2017/0004065 A1* | 1/2017 | Angwin | ............... | G06F 11/3668 |

OTHER PUBLICATIONS

Weimer et al., "Automatically Finding Patches Using Genetic Programming," Software Engineering, 2009. ICSE 2009. IEEE 31st International Conference, pp. 364-374, May 16, 2009.

(Continued)

*Primary Examiner* — Lewis A Bullock, Jr.
*Assistant Examiner* — Tina Huynh
(74) *Attorney, Agent, or Firm* — Maschoff Brennan (57) ABSTRACT

According to an aspect of an embodiment, a method may include identifying a fault at a fault location in a software program using a test suite. The method may also include determining multiple textual similarity scores by determining a textual similarity score with respect to each of multiple repair candidates for the fault. In addition, the method may include sorting the repair candidates based on the textual similarity scores. The method may also include selecting a particular repair candidate from the repair candidates based on the sorting. Moreover, the method may include implementing the particular repair candidate at the fault location based on the selection of the particular repair candidate.

16 Claims, 4 Drawing Sheets

(56) References Cited

OTHER PUBLICATIONS

Le Goues et al., "GenProg: A Generic Method for Automatic Software Repair," IEEE Transactions on Software Engineering, vol. 38, No. 1, Jan. 2012.
Nguyen et al., "DRC: A Detection Tool for Dangling References in PHP-Based Web Applications," Software Engineering (ICSE), 2013 35th International Conference, pp. 1299-1302, May 18, 2013.
Kim et al., "Automatic Patch Generation Learned from Human-Written Patches," The Hong Kong University of Science and Technology, China, Software Engineering (ICSE), 2013 35th International Conference, May 18, 2013.
DeMarco et al., "Automatic Repair of Buggy if Conditions and Missing Preconditions with SMT," CSTVA, Apr. 11, 2014.
Kaleeswaran, et al., "MintHint: Automated Synthesis of Repair Hints," ICSE'14, May 31, 2014.
Tang et al., "Will This Bug-fixing Change Break Regression Testing?," Empirical Software Engineering and Measurement (ESEM), 2015 ACM/IEEE International Symposium, Oct. 22, 2015.
Mechtaev et al., "Directfix: Looking for simple program repairs," 2015 IEEE/ACM 37th IEEE International Conference on Software Engineering, May 16, 2015.
Long et al., "Prophet: Automatic patch generation via learning from successful human patches," Technical Report MIT-CSAIL-TR-2015-019, May 26, 2015.
Long et al., Staged program repair in SPR. In Proceedings of ESEC/FSE 2015 (to appear), Mar. 11, 2015.
U.S. Appl. No. 14/835,561, filed Aug. 25, 2015.
U.S. Appl. No. 14/957,529, filed Dec. 2, 2015.

\* cited by examiner

TEXTUAL SIMILARITY BASED SOFTWARE PROGRAM REPAIR

FIELD

The embodiments discussed in the present disclosure are related to textual similarity based software program repair.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include identifying a fault in a software program using a test suite. The method may also include determining multiple textual similarity scores by determining a textual similarity score with respect to each of multiple repair candidates for the fault. In addition, the method may include sorting the repair candidates based on the textual similarity scores. The method may also include selecting a particular repair candidate from the repair candidates based on the sorting. Moreover, the method may include implementing the particular repair candidate at the fault location based on the selection of the particular repair candidate.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. However, commonly used automated repair systems and techniques often employ inefficient trial and error techniques in attempts to fix faults.

According to one or more embodiments described in the present disclosure, repair effectiveness indications may be determined with respect to repair candidates for a fault of a software program. In particular, a textual similarity score may be determined for each repair candidate of multiple repair candidates for a particular fault. As described below, the textual similarity score for a particular repair candidate may provide an indication as to how effective the particular repair candidate may be with respect to repairing the fault at the particular fault location. The repair candidates may be sorted or pruned based on the textual similarity scores. Additionally, a particular repair candidate may be selected and implemented based on the sorting or pruning. As such, the textual similarity scores may be determined and used by an automated repair system to prioritize the selection and implementation of repair candidates with respect to faults.

Embodiments of the present disclosure are explained with reference to the accompanying drawings.

Figure 1:
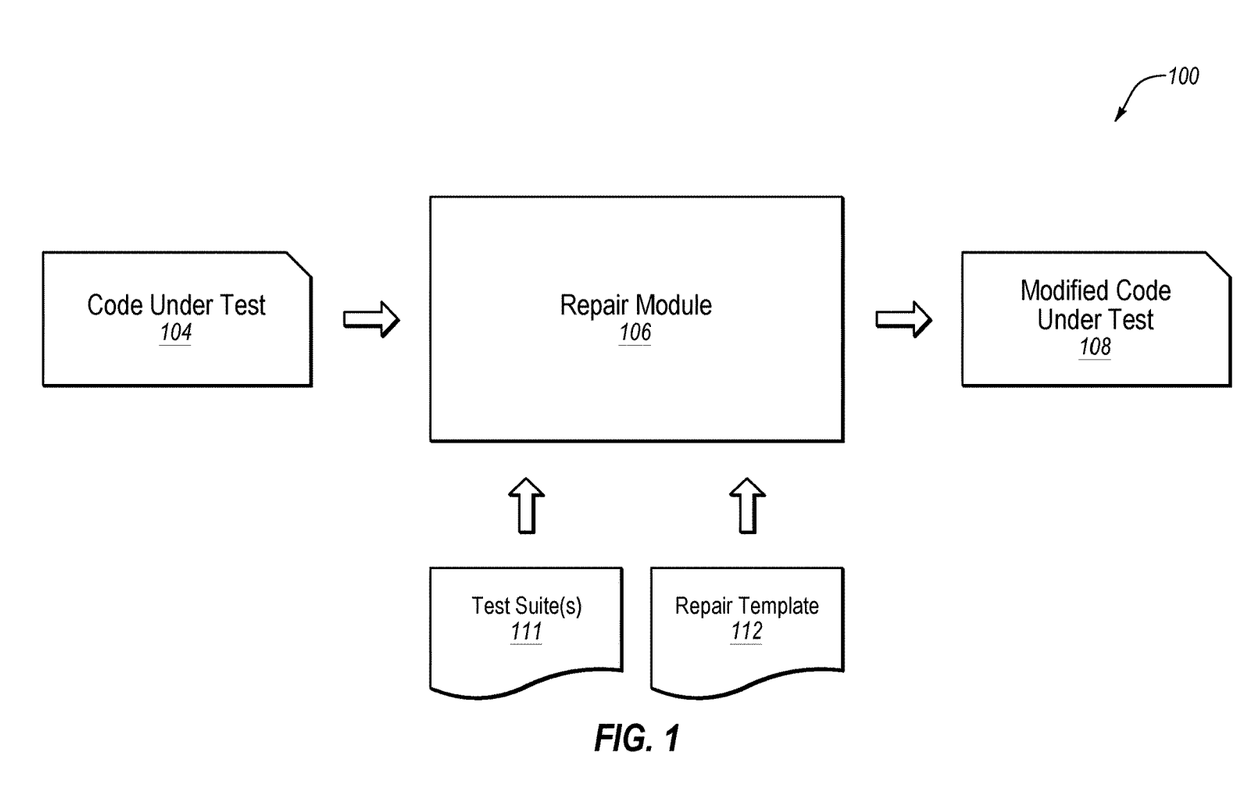
FIG. 1 is a diagram representing an example environment related to repairing a software program.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104. In some embodiments, the repair module 106 may be configured to perform one or more of the repair operations based on a repair template 112 and one or more test suites 111.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults.

In some embodiments, the modifications performed by the repair template 112 may be based on repair candidates that may be associated with the faults. For example, in some embodiments, a fault at a given repair location may include an invocation of a method ("method invocation") and the repair candidates may include different changes that may be made with respect to the method invocation. By way of example, the method invocation may include one or more parameters and the repair candidates may include one or more arguments that may be parameter replacement candidates for each of the parameters. In these or other embodiments, the repair candidates may include one or more other methods that may be used to replace the method included in the method invocation ("method replacement candidates"). Additionally or alternatively, the method invocation may include a receiver object and the repair candidates may include one or more receiver object replacement candidates ("receiver replacement candidates") for the receiver object.

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

As indicated above, the repair module 106 may be configured to determine repair effectiveness indications with respect to repair candidates for each of one or more identified faults of the code under test 104. For example, the repair module 106 may be configured to determine a textual similarity score for each of one or more repair candidates for a particular fault. In particular, in some embodiments, the fault may include a method invocation and the repair module 106 may be configured to determine a textual similarity score with respect to a parameter replacement candidate, a receiver replacement candidate, or a method replacement candidate.

For example, the repair module 106 may be configured to determine, using a textual similarity analysis, a position score with respect to each of the parameter positions that may be included in the method invocation. The position scores may indicate the effectiveness of replacing the parameter at the corresponding parameter position. In these or other embodiments, the repair module 106 may be configured to determine, using a textual similarity analysis, a parameter replacement score with respect to one or more parameter replacement candidates for each parameter that may be included in the method invocation. Additionally or alternatively, the repair module 106 may be configured to determine a composite score for each repair candidate in which the composite score may be based on the parameter replacement score of the corresponding repair candidate and may also be based on a corresponding position score for the parameter position at which the corresponding repair candidate may be inserted.

The repair module 106 may also be configured to determine, using a textual similarity analysis, a receiver replacement score with respect to one or more receiver replacement candidates for a receiver object of the method that may be included in the method invocation. In these or other embodiments, the repair module 106 may also be configured to determine, using a textual similarity analysis, a method replacement score for each of the method replacement candidates.

The textual similarity scores may be determined using any suitable method or technique that may indicate similarities between text that may be included in a string of characters ("character string"). For example, in some embodiments the textual similarity scores may be based on a longest common subsequence determination. In particular, a textual similarity score "TSS" between a first character string "str1" and a second character string "str2" may be determined based on the following expression (1):

$$TSS = (2 \times |LCS(str1, str2)|) / (|str1| + |str2|) \quad (1)$$

In the above expression, "|LCS(str1, str2)|" represents an absolute value of the longest common subsequence between "str1" and "str2" and |str1| and |str2| represent the lengths of "str1" and "str2," respectively. With respect to the above expression, the score may range between "0" and "1" in which a higher score may indicate more similarity between "str1" and "str2." In some embodiments, "TSS" may be subtracted from "1" to generate a textual dissimilarity score ("TDS") according to the following expression (2):

$$TDS = 1 - TSS \quad (2)$$

Although, textual similarity scores are described above with respect to the longest common subsequence, other suitable textual similarity scores may be determined. For example, other methods that determine syntactic distance between strings may be used in some embodiments. In particular, in some embodiments, Levenshtein distance, Damerau-Levenshtein distance, Hamming distance, Jaro-Winkler distance, or Most frequent "k" characters similarity techniques may be used. In these or other embodiments, other suitable techniques for determining semantic similarity between strings or word sequences may be used.

The repair module 106 may be configured to sort or prune the repair candidates based on the textual similarity scores. Additionally, the repair module 106 may be configured to select and implement a particular repair candidate based on the sorting or pruning. In these or other embodiments, the repair module 106 may be configured to run one or more tests included in the test suites 111 after a particular repair candidate has been selected and implemented. In response to a passing test execution, the repair module 106 may be configured to output the modified code under test 108, which may include the implementation of the particular repair candidate.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same thing or may have common sections that may be considered part of two or more of the repair module 106, the test suites 111, and the repair template 112.

Figure 2:
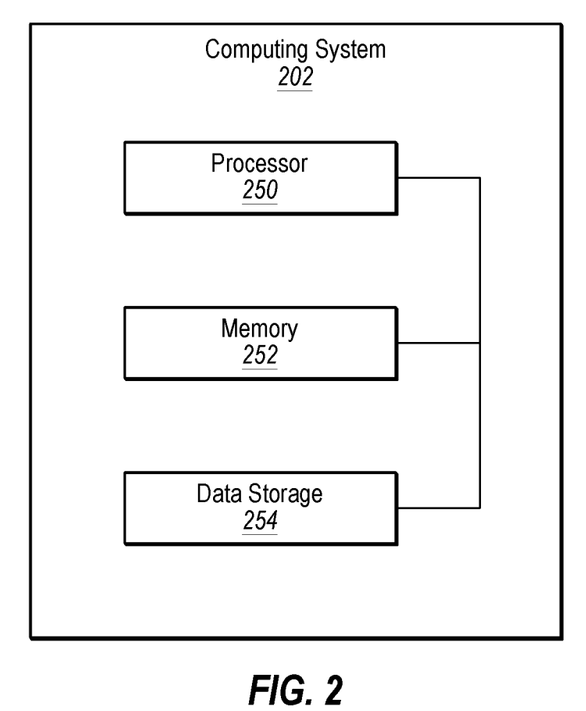
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
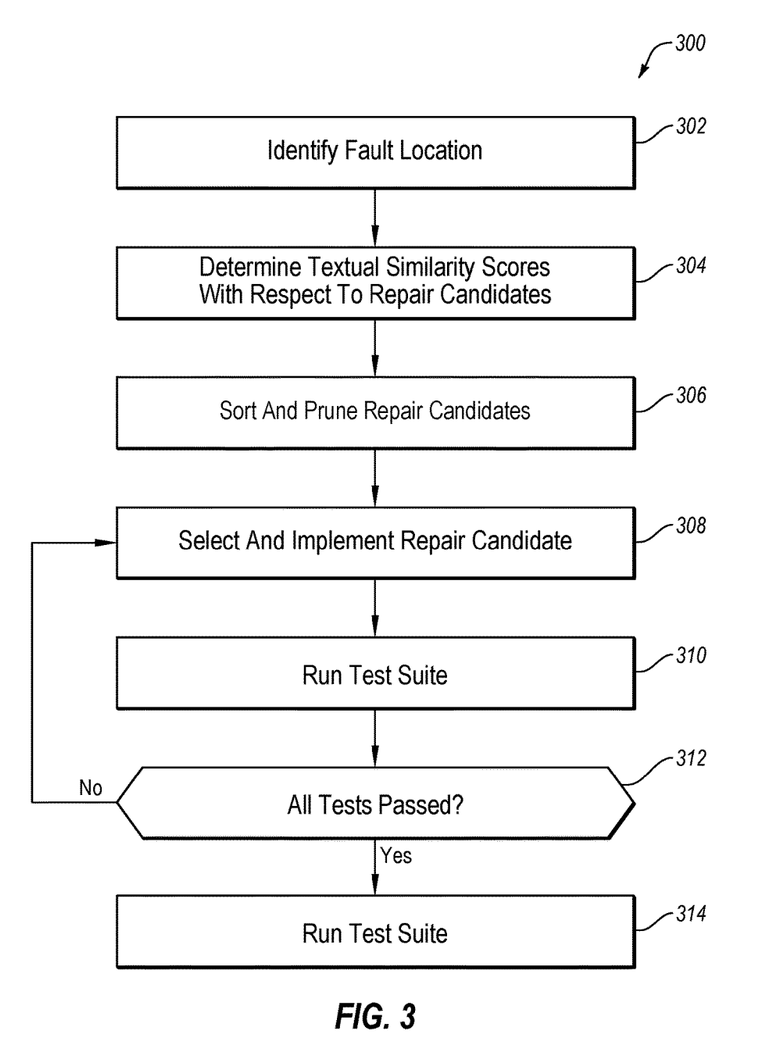
FIG. 3 is a flowchart of an example method of repairing a software program.

FIG. 3 is a flowchart of an example method 300 of repairing a software program, according to at least one embodiment described in the present disclosure. The method 300 may be performed by any suitable system, apparatus, or device with respect to code under test. For example, the repair module 106 of FIG. 1 or the computing system 202 of FIG. 2 (as directed by a repair module) may perform one or more of the operations associated with the method 300 with respect to the code under test 104. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a fault may be located in the code under test. The fault localization may be performed with respect to the code under test using any suitable technique. In some embodiments, the fault localization may identify a fault location and one or more potential faults at the fault location. The fault localization may be performed based on application of the one or more test suites to the code under test.

At block 304, textual similarity scores may be determined with respect to one or more repair candidates for one or more potential faults at the fault location. Further detail with respect to determining textual similarity scores is given with respect to a method 400 of FIG. 4.

At block 306, repair candidates for the faults at the fault location identified at block 302 may be sorted and pruned. The repair candidates may be sorted and pruned based on the textual similarity scores determined at block 304. For example, in some embodiments, the repair candidates may be ordered in a list according to their repair effectiveness as indicated by the textual similarity scores. In these or other embodiments, repair candidates with textual similarity scores that indicate relatively low repair effectiveness may be removed from the list of repair candidates for a corresponding fault.

Additionally or alternatively, the removal of specific repair candidates from the list may be based on those repair candidates having a textual similarity score that does not satisfy a particular threshold. In some embodiments, the particular threshold may be empirically determined. For example, an empirical study may be performed in which the results may indicate that textual similarity may be a basis for determining repairs. The study may also indicate as to what "degree" of textual similarity may be meaningful indicator of valid repairs. The particular threshold may accordingly be set based on the indicated degree of textual similarity. In these or other embodiments, the particular threshold may also be based on limiting the computational resources needed to evaluate the pool of possible candidates. For example, the particular threshold may be based on selecting only the top 5 or top 10 repair candidates for each parameter, method name, or receiver object replacement.

At block 308 a repair candidate may be selected and implemented. In some embodiments, the repair candidate with the highest potential effectiveness as indicated by the textual similarity scores may be selected and implemented.

In these or other embodiments, the repair candidate may be selected according to the sorting of repair candidates in some embodiments. For example, in some embodiments, a list of repair candidates may be ordered based on their respective textual similarity scores such that the repair candidates are ordered from highest potential effectiveness to lowest potential effectiveness as indicated by their textual similarity scores. In these or other embodiments, the repair candidate at the top of the list may be selected and implemented at block 308.

At block 310, a test suite may be run with the selected repair candidate implemented in the code-under test. At block 312, it may be determined whether all the tests of the test suite may be passed after repair has been synthesized. In some embodiments, it may be determined whether previously failing test executions are transformed into passing executions as a consequence of the repair. For example, it may be determined whether or not the modifications made in the repair were such that the fault is no longer deemed a fault. In these or other embodiments positive tests may be performed to determine whether the modifications introduced other faults that were not previously present.

In response to determining that the tests were passed, the method 300 may proceed from block 312 to block 314. In response to determining that the tests were not passed, the method 300 may proceed from block 312 back to block 308 where another repair candidate may be selected.

At block 314, modified code under test may be output. The modified code under test may include modifications that may pass the tests of the test suite such that the modified code under test may include a repaired version of the code under test that may be received at block 302.

The method 300 may thus improve the efficiency of software program testing and repair. For example, the determining of the textual similarity scores to indicate repair effectiveness and the associated prioritization of corresponding repair candidates may reduce the amount of processing that may be performed.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 300 may be performed iteratively in which a single fault or a single fault location may be analyzed at a time. Additionally or alternatively, one or more operations associated with one or more blocks may be performed with respect to multiple faults or multiple fault locations at a time.

Figure 4:
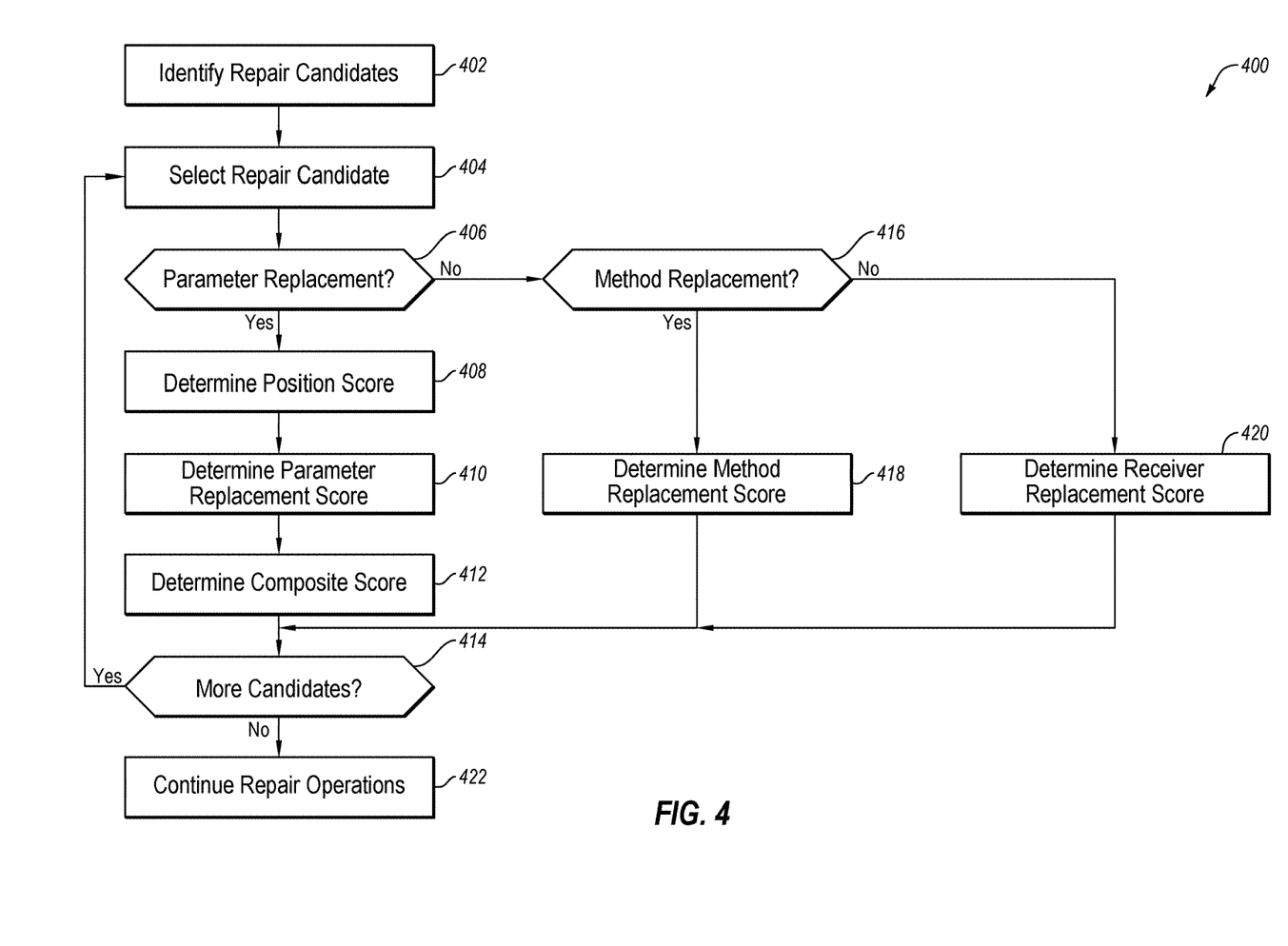
FIG. 4 is a flowchart of an example method of software program repair operations.

FIG. 4 is a flowchart of an example method 400 of software program repair operations, according to at least one embodiment described in the present disclosure. The method 400 may be performed by any suitable system, apparatus, or device with respect to code under test. For example, the repair module 106 of FIG. 1 or the computing system 202 of FIG. 2 (as directed by a repair module) may perform one or more of the operations associated with the method 400 with respect to the code under test 104. In addition, in some embodiments, one or more operations of the method 400 may be performed with respect to blocks 304, 306, 308, 310, 312, and 314 of the method 300 in some embodiments. In particular, operations described below with respect to blocks 402, 404, 406, 408, 410, 412, 414, 416, 418, and 420 may be performed with respect to block 304 of the method 300. In addition, operations described above with respect to blocks 306, 308, 310, 312, and 314 may be performed with respect to block 422 described below. Although illustrated with discrete blocks, the steps and operations associated with one or more of the blocks of the method 400 may be divided into additional blocks, combined into fewer blocks, or eliminated, depending on the particular implementation.

The method 400 may begin at block 402 at which repair candidates for a particular fault at a particular fault location (e.g., the fault location identified at block 302 of FIG. 3) may be identified. As mentioned above, in some embodiments, the particular fault may include a method invocation of a particular method, the fault may involve this method invocation, and the repair candidates may include one or more parameter replacement candidates, one or more receiver replacement candidates, or one or more method replacement candidates with respect to the particular method of the method invocation.

In some embodiments, one or more parameter replacement candidates may be identified for each parameter that may be included in the method invocation. In particular, a variable type may be identified for each parameter and other variables in the code-under-test that have the same variable type may be each be identified as a parameter replacement candidate for a corresponding parameter. In some embodiments, every variable that is available for analysis (e.g., that is in scope at the suspected fault location during program execution) and that is of the same type as a particular parameter may be identified as a parameter replacement candidate for the particular parameter.

Additionally or alternatively, one or more method replacement candidates may be identified from other methods of the code-under-test. In particular, one or more methods in the code-under-test that have the same signature, or substantially the same signature, as the particular method may each be identified as a method replacement candidate. In some embodiments, every method that is available for analysis and that has the same signature as the particular method may be identified as a method replacement candidate. In the present disclosure, methods that include a same number, order, and type of parameters may be considered as having a same or a substantially same signature.

In these or other embodiments, the method invocation may include a receiver object and one or more receiver replacement candidates may be identified for the receiver object. In particular, one or more objects in the code-under-test that have the same type as the receiver object of the method invocation may each be identified as a receiver replacement candidate. In some embodiments, every receiver object that is available for analysis and that is the same type as the receiver object of the method invocation may be identified as a receiver replacement candidate.

At block 404, a repair candidate of the repair candidates identified at block 402 may be selected. At block 406, it may be determined whether the selected repair candidate is a parameter replacement candidate. In particular, in some embodiments, it may be determined whether the repair candidate is an argument that may be used to replace a parameter and if so it may be determined that the repair candidate is a parameter replacement candidate. In response to determining that the repair candidate is a parameter replacement candidate (e.g., an argument), the method 400 may proceed to block 408 from block 406. In response to determining that the repair candidate is not a parameter replacement candidate (e.g., not an argument), the method 400 may proceed to block 416 from block 406.

At block 408, a position score may be determined for the parameter replacement candidate. In particular, the parameter replacement candidate may correspond to a particular parameter position in the method invocation. The position score may indicate an effectiveness of replacing a particular parameter at the particular parameter position in the method invocation. For example, in some instances, an amount of dissimilarity of the character string of the particular parameter with respect to the characters strings of the other parameters at the particular parameter position in other invocations of the particular method may be directly proportional to a repair effectiveness with respect to changing the particular parameter. As such, in some embodiments, the position score may be determined such that it may reflect a dissimilarity between the character string of the particular parameter and the character strings of other parameters at the particular parameter position in other invocations of the particular method.

In some embodiments, the position score may be determined based on a parameter textual similarity score between the particular parameter and the other parameters at the particular parameter position in the other method invocations of the particular method. In some embodiments, every method invocation of the particular method that appears in the code under test may be identified. Additionally, in some embodiments, a parameter textual similarity score may be determined between the particular parameter and each parameter of the other method invocations that is at the particular parameter position. In these or other embodiments, these textual similarity scores may be used to determine the position score. For example, the different parameter textual similarity scores that correspond to the particular parameter position and the other method invocations may be averaged to determine the position score.

In some embodiments, the parameter textual similarity scores that may be used to determine the position score may include a textual dissimilarity score that may be based on the longest common subsequence between the particular parameter and the corresponding other parameters at the particular parameter position using expression (2) described above. In such instances, a higher position score may indicate an increased likelihood of effectiveness of replacing the particular parameter at the particular parameter position.

At block 410, a parameter replacement score may be determined for the parameter replacement candidate. The parameter replacement score may indicate an effectiveness of replacing the particular parameter at the particular parameter position in the method invocation with the parameter replacement candidate. For example, in some instances, an amount of similarity of the character string of the particular parameter with respect to the character string of the parameter replacement candidate may be directly proportional to a repair effectiveness with respect to replacing the particular parameter with the parameter replacement candidate. As such, in some embodiments, the parameter replacement score may be determined such that it may reflect a similarity between the character string of the particular parameter and the character string of the parameter replacement candidate.

In some embodiments, the parameter replacement score may be determined as a parameter textual similarity score between the particular parameter and the parameter replacement candidate. In some embodiments, the parameter textual similarity score may be determined based on the longest common subsequence between the particular parameter and the parameter replacement candidate and using expression (1) described above. In such instances, a higher parameter replacement score may indicate an increased likelihood of effectiveness of replacing the particular parameter with the parameter replacement candidate.

At block 412, a composite score may be determined with respect to the parameter replacement candidate. In some embodiments, the composite score may be based on the position score determined at block 408 and the parameter replacement score determined at block 410 with respect to the parameter replacement candidate. For example, in some embodiments, the position score may be determined using expression (2) above and the parameter replacement score may be determined using expression (1) above. In some of these embodiments, the composite score may include a product of the position score and the parameter replacement score. Additionally or alternatively, the position score and the parameter replacement score may be combined through an average or a weighted average of the position score and parameter replacement score.

Following block 412, the method 400 may proceed to block 414, which is explained in further detail below. Returning to block 406, in response to the selected repair candidate not being a parameter replacement candidate, the method 400 may proceed from block 406 to block 416 as mentioned above. At block 416, it may be determined whether the selected repair candidate may be a method replacement candidate. In response to the selected repair candidate being a method replacement candidate, the method 400 may proceed from block 416 to block 418. In response to the selected repair candidate not being a method replacement candidate, the method 400 may proceed from block 416 to block 420.

At block 418, a method replacement score may be determined for the method replacement candidate. The method replacement score may indicate an effectiveness of replacing the particular method with the method replacement candidate. For example, in some instances, an amount of similarity of the character string of the particular method name with respect to the character string of the method name of the replacement candidate may be directly proportional to a repair effectiveness with respect to replacing the particular method with the method replacement candidate. As such, in some embodiments, the method replacement score may be determined such that it may reflect a similarity between the character string of the particular method's name and the character string of the method name of the replacement candidate.

In some embodiments, the method replacement score may be determined as a method textual similarity score between the particular method name and the method replacement candidate name. In some embodiments, the method textual similarity score may be determined based on the longest common subsequence between the particular method name and the method replacement candidate name and by using expression (1) described above. In such instances, a higher method replacement score may indicate an increased likelihood of effectiveness of replacing the particular method with the method replacement candidate.

Following block 418, the method 400 may proceed to block 414, which is explained in further detail below. Returning to block 416, in response to the selected repair candidate not being a method replacement candidate, it may be determined that the selected repair candidate may be a receiver replacement candidate and the method 400 may proceed from block 416 to block 420 as mentioned above.

At block 420, a receiver replacement score may be determined for the receiver replacement candidate. The receiver replacement score may indicate an effectiveness of replacing a particular receiver object of the particular method with the receiver replacement candidate. For example, in some instances, an amount of similarity of the character string of the particular receiver object name with respect to the character string of the receiver replacement candidate name may be directly proportional to a repair effectiveness with respect to replacing the particular receiver object with the receiver replacement candidate. As such, in some embodiments, the receiver replacement score may be determined such that it may reflect a similarity between the character string of the particular receiver object's name and the character string of the receiver replacement candidate's name.

In some embodiments, the receiver replacement score may be determined as a receiver textual similarity score between the particular receiver object's name and the receiver replacement candidate's name. In some embodiments, the receiver textual similarity score may be determined based on the longest common subsequence between the particular receiver object and the receiver replacement candidate and by using expression (1) described above. In such instances, a higher receiver replacement score may indicate an increased likelihood of effectiveness of replacing the particular receiver object with the receiver replacement candidate.

The method 400 may proceed to block 414 following block 420. At block 414, it may be determined whether there are any more repair candidates of the repair candidates identified in block 402 that have not been scored. In response to there being one or more repair candidates to score, the method 400 may return to block 404 at which another repair candidate may be selected. In response to all the repair candidates being scored, the method 400 may procced from block 414 to block 422.

At block 422, repair operations with respect to the code under test may be continued using the scored repair candidates. For example, in some embodiments, operations described above with respect to blocks 306, 308, 310, 312, and 314 may be performed at block 422.

The method 400 may thus be used to determine the repair effectiveness of one or more repair candidates with respect to a particular fault in the code-under-test. Further, the determined repair effectiveness may be used to prioritize which repair candidates to select for implementation, which may improve the efficiency of repairing the code-under-test.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 400 may be performed iteratively in which a single fault or repair candidate may be analyzed at a time. Additionally or alternatively, one or more operations associated with one or more blocks may be performed with respect to multiple faults or repair candidates at a time. Further, although method 400 is described in particular with respect to determining textual similarity scores that correspond to a method invocation of the code-under test, similar principles may be used to determine textual similarity scores with respect to other faults that do not include method invocations. For example, textual similarity, such as described above, may be used to repair faulty arithmetic or logical expressions, by replacing sub-expressions or individual variables in those expressions, with suitable variants occurring (frequently) in other parts of the program.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    identifying a fault at a fault location in a software program using a test suite, the fault including a method invocation that invokes a method and that includes a plurality of parameters, each of the plurality of parameters being at a parameter position with respect to the method invocation;
    determining a plurality of textual similarity scores by determining a textual similarity score with respect to each of a plurality of repair candidates for the fault, the plurality of repair candidates including a plurality of parameter replacement candidates for each of the plurality of parameters and the determining of the plurality of textual similarity scores including:
        determining a replacement score for each parameter replacement candidate;
        determining a position score for each parameter position; and
        determining a composite score for each repair candidate in which the composite score is based on a corresponding replacement score and a corresponding position score associated with the respective repair candidate;
    sorting the plurality of repair candidates based on repair effectiveness as indicated by the textual similarity scores;
    selecting a particular repair candidate from the plurality of repair candidates based on the sorting; and
    implementing the particular repair candidate at the fault location based on the selection of the particular repair candidate.

2. The method of claim 1, further comprising determining the textual similarity score based on a longest common subsequence determination.

3. The method of claim 1, wherein:
    the method invocation is a first method invocation; and
    determining the position score for a particular parameter position includes:
        identifying, in the software program, a second method invocation of the method invoked by the first method invocation; and
        determining a parameter textual similarity score between a first parameter at the particular parameter position in the first method invocation and a second parameter at the particular parameter position in the second method invocation.

4. The method of claim 1, wherein determining the position score for a particular parameter position includes:
    identifying, in the software program, a plurality of other method invocations of the method invoked by the method invocation;
    obtaining a plurality of parameter textual similarity scores by determining a parameter textual similarity score between a parameter at the particular parameter position in the method invocation and each parameter at the particular parameter position in the plurality of other identified method invocations; and
    averaging the plurality of parameter textual similarity scores.

5. The method of claim 1, wherein the plurality of parameter replacement candidates are selected as parameter replacement candidates based on each parameter replacement candidate having a same variable type as the parameter.

6. The method of claim 1, wherein:
    the plurality of repair candidates includes a plurality of other methods in the software program that have a same signature as the method; and
    determining the plurality of textual similarity scores includes determining a plurality of method replacement scores by determining a method textual similarity score between a name of the method and that of each of the other methods.

7. The method of claim 1, wherein the plurality of repair candidates is a first plurality of repair candidates and the method further comprises:
    obtaining a second plurality of repair candidates by pruning the first plurality of repair candidates based on the textual similarity scores; and
    selecting the particular repair candidate from the second plurality of repair candidates based on the sorting.

8. The method of claim 1, wherein:
    the method invocation includes a receiver object;
    the plurality of repair candidates includes a plurality of receiver replacement candidates for the receiver object included in the method invocation; and
    determining the plurality of textual similarity scores includes determining a receiver replacement score for each receiver replacement candidate.

9. The method of claim 8, wherein the plurality of receiver replacement candidates are selected as receiver replacement candidates based on each receiver replacement candidate having a same type as the receiver object.

10. The method of claim 8, wherein determining the receiver replacement score for a particular receiver replacement candidate of the plurality of receiver replacement candidates includes determining the receiver replacement score based on a longest common subsequence between a name of the receiver object and a name of the particular receiver replacement candidate.

11. Non-transitory computer-readable storage media including computer-executable instructions configured to, in response to execution by one or more processors, cause a system to perform operations, the operations comprising:
    identifying a fault at a fault location in a software program using a test suite, the fault including a method invocation that invokes a method and that includes a plurality of parameters, each of the plurality of parameters being at a parameter position with respect to the method invocation;

determining, in response to the fault including the method invocation, a plurality of textual similarity scores by determining a textual similarity score with respect to each of a plurality of repair candidates for the fault, the plurality of repair candidates including a plurality of parameter replacement candidates for each of the plurality of parameters and the determining of the plurality of textual similarity scores including:
- determining a replacement score for each parameter replacement candidate;
- determining a position score for each parameter position; and
- determining a composite score for each repair candidate in which the composite score is based on a corresponding replacement score and a corresponding position score associated with the respective repair candidate;

sorting the plurality of repair candidates based on repair effectiveness as indicated by the textual similarity scores;

selecting a particular repair candidate from the plurality of repair candidates based on the sorting; and implementing the particular repair candidate at the fault location based on the selection of the particular repair candidate.

12. The computer-readable storage media of claim 11, wherein:
- the plurality of repair candidates includes a plurality of other methods in the software program that have a same signature as the method; and
- determining the plurality of textual similarity scores includes determining a plurality of method replacement scores by determining a method textual similarity score between the method and each of the other methods.

13. The computer-readable storage media of claim 11, wherein the plurality of repair candidates is a first plurality of repair candidates and the operations further comprise:
- obtaining a second plurality of repair candidates by pruning the first plurality of repair candidates based on the textual similarity scores; and
- selecting the particular repair candidate from the second plurality of repair candidates based on the sorting.

14. The computer-readable storage media of claim 11, wherein:
- the method invocation includes a receiver object;
- the plurality of repair candidates includes a plurality of receiver replacement candidates for the receiver object included in the method invocation; and
- determining the plurality of textual similarity scores includes determining a receiver replacement score for each receiver replacement candidate.

15. The computer-readable storage media of claim 11, wherein the operations further comprise determining the textual similarity score based on a longest common subsequence determination.

16. A method comprising:
- identifying a fault at a fault location in a software program using a test suite, the fault including a method invocation that invokes a method, the method invocation including a parameter and a receiver object;
- identifying a plurality of repair candidates for the fault based on the fault including the method invocation, the plurality of repair candidates including one or more parameter replacement candidates for the parameter, one or more method replacement candidates for the method, and one or more receiver replacement candidates for the receiver object;
- determining, in response to the fault including the method invocation, a plurality of textual similarity scores by determining a textual similarity score with respect to each of the plurality of repair candidates for the fault, the determining of the plurality of textual similarity scores including:
  - determining a replacement score for each parameter replacement candidate;
  - determining a position score for each parameter position; and
  - determining a composite score for each repair candidate in which the composite score is based on a corresponding replacement score and a corresponding position score associated with the respective repair candidate;
- sorting the plurality of repair candidates based on repair effectiveness as indicated by the textual similarity scores;
- selecting a particular repair candidate from the plurality of repair candidates based on the sorting; and
- implementing the particular repair candidate at the fault location based on the selection of the particular repair candidate.

* * * * *